(12) United States Patent
Bevan et al.

(10) Patent No.: US 7,168,758 B2
(45) Date of Patent: Jan. 30, 2007

(54) MODULAR COMFORT ASSEMBLY FOR OCCUPANT SUPPORT

(75) Inventors: Michael J. Bevan, Amherstburg (CA); Benson J. Brady, Windsor (CA)

(73) Assignee: IGB Automotive Ltd., Windsor (CA)

( * ) Notice: Subject to any disclaimer, the term of this patent is extended or adjusted under 35 U.S.C. 154(b) by 0 days.

(21) Appl. No.: 10/816,701

(22) Filed: Apr. 2, 2004

(65) Prior Publication Data
US 2004/0245811 A1 Dec. 9, 2004

Related U.S. Application Data

(60) Provisional application No. 60/476,207, filed on Jun. 5, 2003.

(51) Int. Cl.
*A47C 7/74* (2006.01)
(52) U.S. Cl. .................... 297/180.13; 297/180.1; 297/180.11; 297/180.12; 297/180.14
(58) Field of Classification Search .......... 297/180.1, 297/180.11, 180.12, 180.13, 180.14, 180.15
See application file for complete search history.

(56) References Cited

U.S. PATENT DOCUMENTS

| 3,638,255 A | * | 2/1972 | Sterrett ................. 297/180.1 |
| 4,335,725 A | * | 6/1982 | Geldmacher ........... 297/180.11 |
| 4,997,230 A | * | 3/1991 | Spitalnick ............. 297/180.11 |
| 5,370,439 A | * | 12/1994 | Lowe et al. ........... 297/180.11 |
| 5,411,318 A | * | 5/1995 | Law ..................... 297/180.11 |
| 5,516,189 A | * | 5/1996 | Ligeras ................ 297/180.11 |
| 5,613,730 A | * | 3/1997 | Buie et al. ............ 297/180.12 |
| 5,692,952 A | * | 12/1997 | Chih-Hung ........... 297/180.11 |
| 5,715,695 A | * | 2/1998 | Lord .................... 297/180.1 |
| 5,926,884 A | * | 7/1999 | Biggie et al. ....... 297/180.13 X |
| 5,927,817 A | * | 7/1999 | Ekman et al. ........ 297/180.14 |
| 6,273,810 B1 | * | 8/2001 | Rhodes et al. ....... 297/180.13 |
| 6,511,125 B1 | * | 1/2003 | Gendron .............. 297/180.11 |
| 6,629,724 B2 | * | 10/2003 | Ekern et al. .......... 297/180.11 |
| 6,786,541 B2 | * | 9/2004 | Haupt et al. .......... 297/180.1 |
| 6,863,342 B2 | * | 3/2005 | Floyd, Jr. ............. 297/180.11 |
| 6,869,140 B2 | * | 3/2005 | White et al. .......... 297/180.13 |

FOREIGN PATENT DOCUMENTS

| EP | 280212 A1 | * | 8/1988 |
| FR | 2694527 A1 | * | 2/1994 |
| WO | WO 9409684 A1 | * | 5/1994 |

* cited by examiner

*Primary Examiner*—Rodney B. White
*Assistant Examiner*—Stephen D'Adamo
(74) *Attorney, Agent, or Firm*—Fildes & Outland, P.C.

(57) ABSTRACT

A modular comfort assembly adapted for installation within an occupant support includes a ventilation diffuser bag allowing for circulation of air through the bag. The diffuser bag includes a side surface having perforations therein and an opposite non-perforated side. The modular comfort assembly further includes a heating element and a lumbar support system. The heating element is adapted for placement on the surface of the diffuser bag having the perforations therein. The lumbar support system is adapted for placement on the non-perforated side of the diffuser bag.

14 Claims, 4 Drawing Sheets

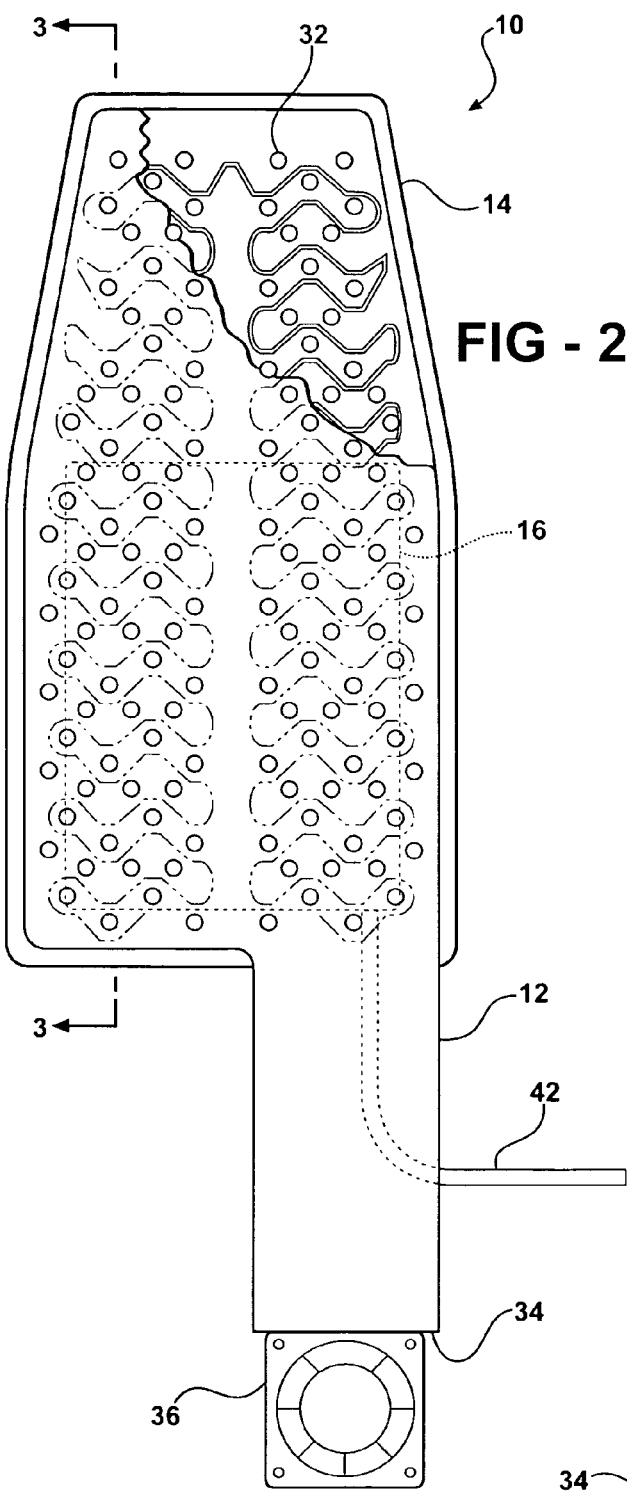
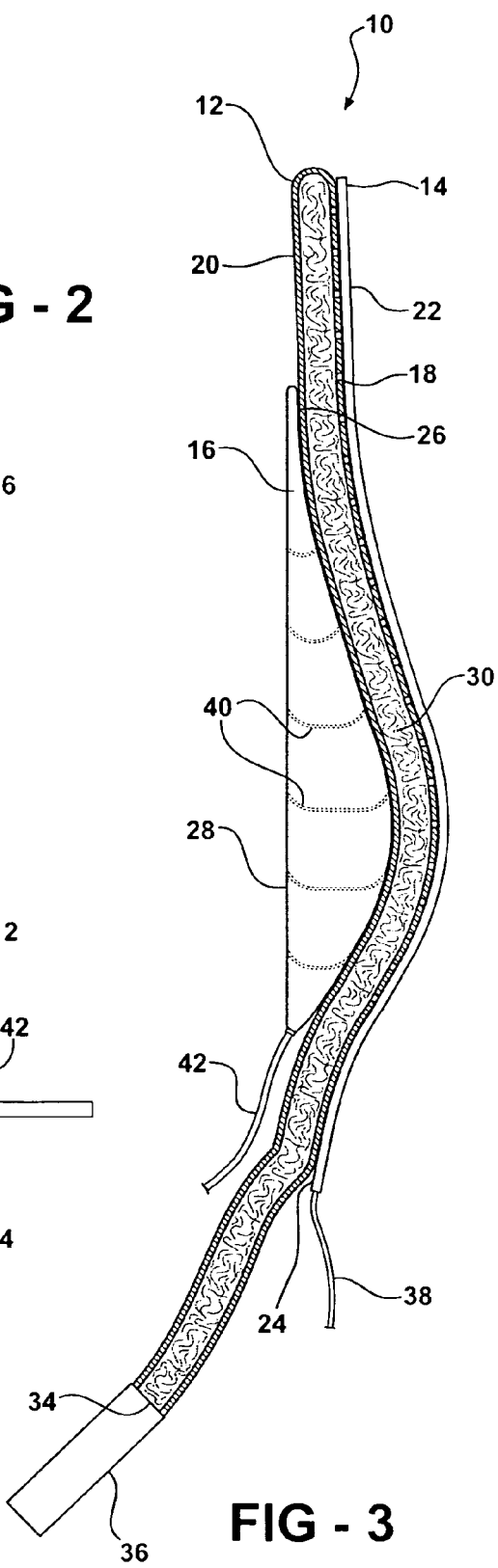

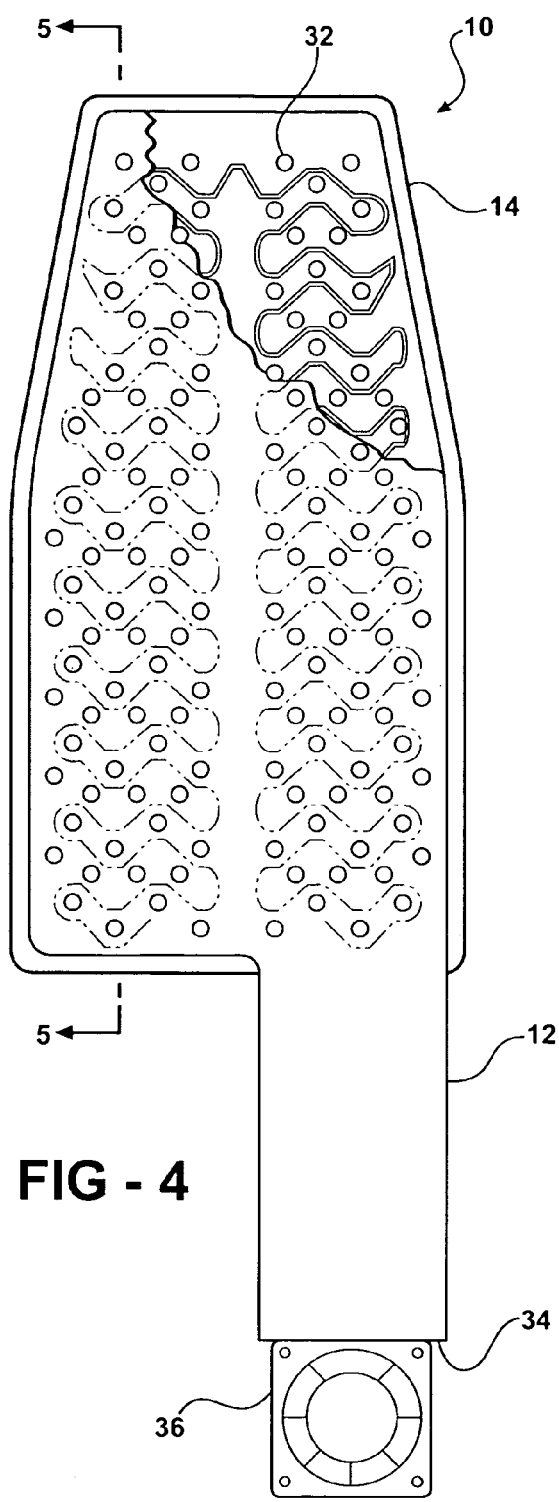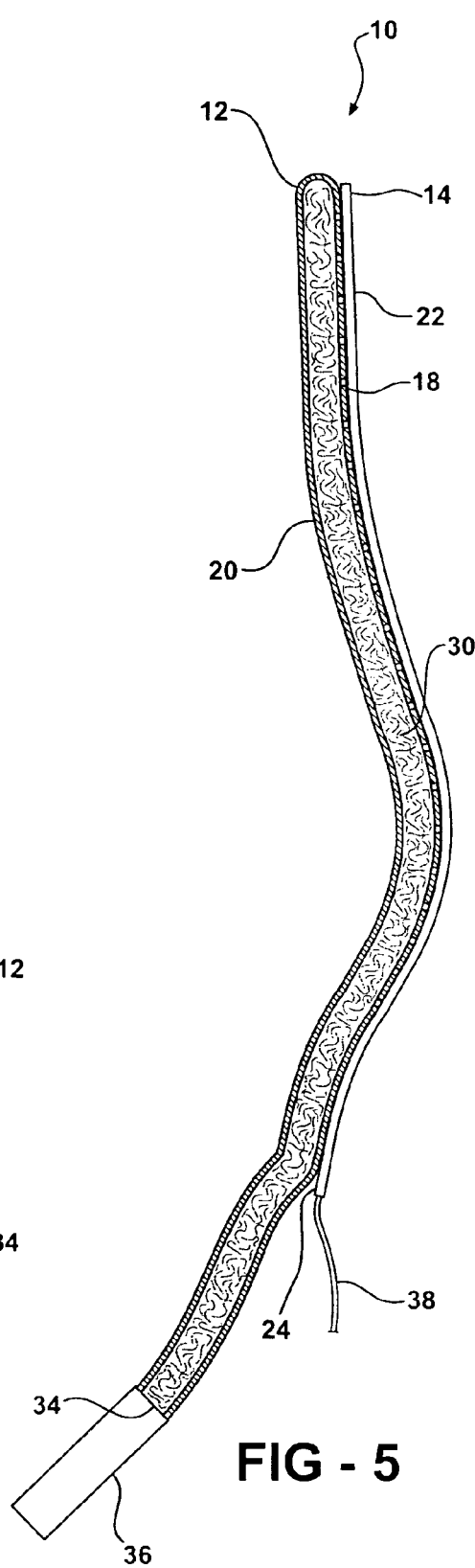

MODULAR COMFORT ASSEMBLY FOR OCCUPANT SUPPORT

CROSS REFERENCE TO RELATED APPLICATION

This application claims the benefit of U.S. Provisional Application No. 60/476,207, filed Jun. 5, 2003.

TECHNICAL FIELD

This invention relates generally to the field of comfort systems for occupant supports and more particularly to heating, venting and lumbar support systems for vehicle seating.

BACKGROUND OF THE INVENTION

It is known in the art relating to automotive seating comfort systems to install stand-alone heating, venting and/or lumbar systems within the seat as separate units. Such individual application of more than one comfort system into a seat can be difficult and time consuming.

Further, it is known in the art relating to automotive seating comfort systems to heat the seat by moving air over a heating element to warm the moving air and to subsequently heat the seat surface. This is inefficient as there may be heat loss in the moving air.

Furthermore, it is known in the art relating to automotive seating comfort systems to condition the air moving that passes through the ventilation system to cool the vehicle seat. This is also inefficient because it requires the use of a separate air conditioner in the comfort system. The air conditioning unit itself makes the comfort system costlier to manufacture and the use of the unit, once installed, requires a high energy input.

SUMMARY OF THE INVENTION

The present invention provides a modular assembly of comfort systems or subassemblies of heating, venting and/or lumbar support devices adaptable for use with occupant supports such as vehicle seats wherein a heating element, a ventilation "diffuser" and a lumbar support element are integrated into a single assembly. Such a modular comfort assembly has the advantage of allowing for the insertion into an occupant support such as a seat or other of a heating element, a ventilation element and a lumbar support element in one convenient operation. Moreover, the modular assembly has the advantage of being operable by a single control module or separate controllers for each component.

More specifically, a modular comfort assembly in accordance with one embodiment of the invention includes a pneumatic, mechanical, and/or electrical lumbar support system with internal baffles to achieve the desired shape. An air pump is connected to the lumbar support system to allow for inflation and deflation of the system. Pressure sensitive adhesive, Velcro, or other similar material on the back side of the lumber support allows for mounting of the assembly to the surface of the interior foam of the seat. The modular comfort assembly further includes a ventilation "diffuser bag" having air permeable fabric encapsulated within the bag. The bag has an air inlet on one end thereof. A surface of the bag closest to the seat occupant includes perforations for air flow therethrough.

An air mover such as a fan or blower may be connected to the diffuser bag inlet and mounted to the backside surface of the seat cushion foam with pressure sensitive adhesive, Velcro, or other similar material. Alternatively, the air mover may be mounted underneath the seat cushion or any other area in close proximity to the seat. The air mover causes circulation of air through the "diffuser bag" but does not condition or otherwise treat the air. Instead, the movement of air by the air mover through the "diffuser bag" gives the seat occupant the perception of being cool because of the convective effect of air moving over the occupant's body.

The backside surface of the ventilation bag is lined with pressure sensitive adhesive, Velcro, or other similar material for attachment to the front surface of the lumbar support. The modular comfort assembly further includes a heating element that attaches to the front surface of the ventilation "diffuser bag" via pressure sensitive adhesive, Velcro, or other similar material. The surface of the heating element is permeable to communicate ventilating air to the seat occupant, but the heating of the seat via the heating element is independent of the movement of air through the "diffuser bag" and the permeable surface of the heating element.

In another embodiment of the invention, the comfort assembly includes a heating element and a ventilation "diffuser bag." In this embodiment, the back side of the heating element is attached to the front side of the "diffuser bag" via pressure sensitive adhesive, Velcro, or other similar material. The back side of the "diffuser bag" is also lined with pressure sensitive adhesive, Velcro, or other similar material for attachment of the assembly to the foam cushion of the seat. An air mover is connected to the "diffuser bag" to deliver unconditioned air to the ventilation system. The surface of the heating element is permeable to allow for communication of ventilating air to the seat occupant, but the heating of the seat is independent of the ventilation system.

In yet another embodiment of the invention, the comfort assembly includes a heating element and pneumatic, mechanical, and/or electrical lumbar support system. In this embodiment, the back side of the heating element is attached to the front side of the lumbar support system via pressure sensitive adhesive, Velcro, or other similar material. The back side of the lumbar support system is also lined with pressure sensitive adhesive, Velcro, or other similar material for attachment of the assembly to the foam cushion of the seat. An air pump is connected to the lumbar support system to allow for inflation and deflation of the system.

These and other features and advantages of the invention will be more fully understood from the following detailed description of the invention taken together with the accompanying drawings.

BRIEF DESCRIPTION OF THE DRAWINGS

In the drawings:

FIG. 2 is a cutaway elevational view of one embodiment of a modular comfort system including a diffuser bag, a heating element and a lumbar support in accordance with the invention;

FIG. 3 is a sectional view taken along lines 3—3 in FIG. 2;

FIG. 4 is a cutaway elevational view of a second embodiment of a modular comfort system including a diffuser bag and a heating element in accordance with the invention;

FIG. 5 is a sectional view taken along lines 5—5 in FIG. 4;

DETAILED DESCRIPTION OF THE INVENTION

Figure 1:
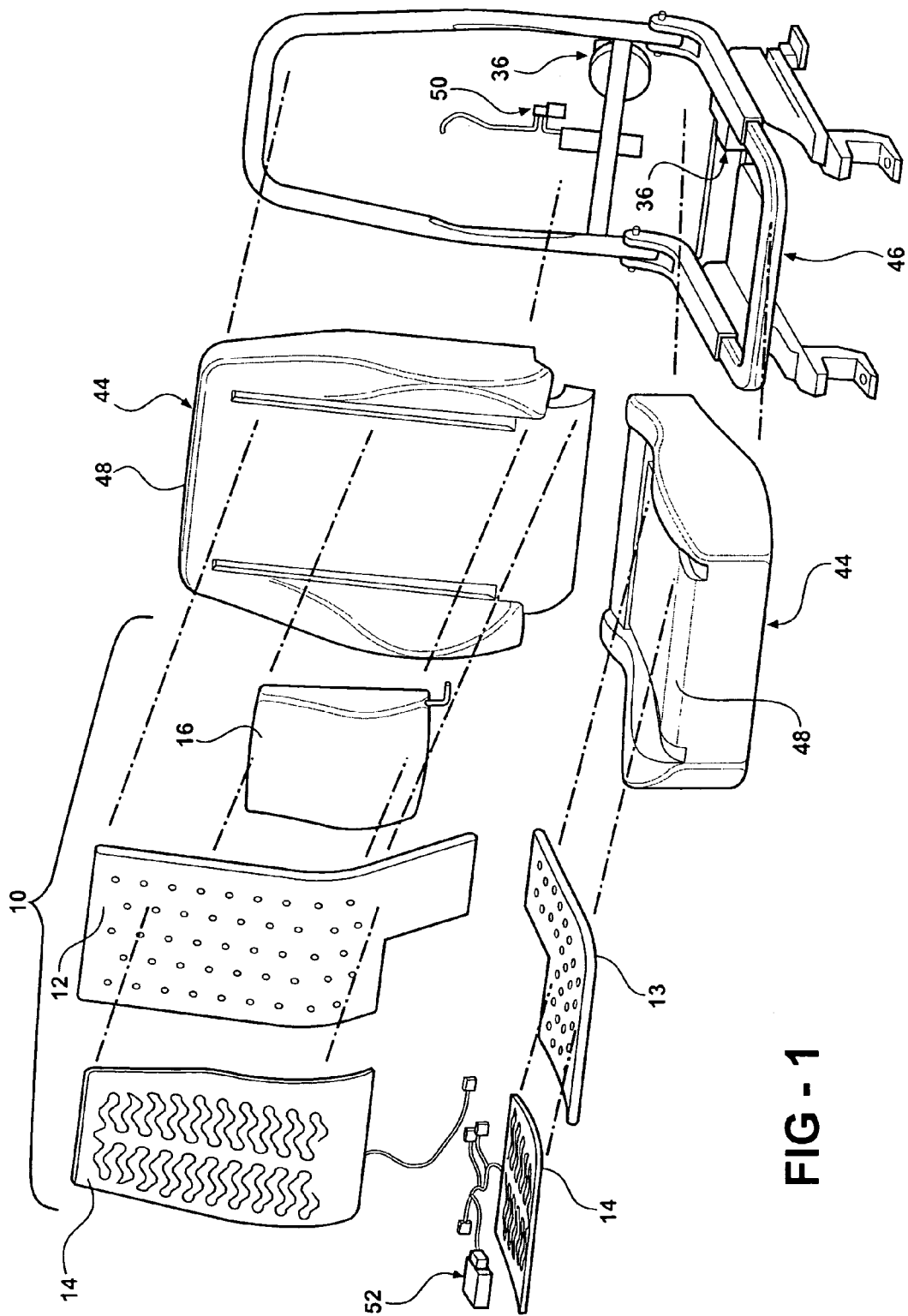
FIG. 1 is an exploded environmental perspective view of a vehicle seating assembly and modular comfort systems or subassemblies of heating, venting, and/or lumbar support devices constructed in accordance with the invention adapted for assembly in the seating assembly.

Referring now to the drawings in detail, numeral 10 generally indicates a modular comfort assembly in accordance with the present invention adapted for installation within an occupant support such as an automotive vehicle seat.

With reference to FIGS. 2 and 3, in a preferred embodiment of the present invention a modular comfort assembly 10 includes a ventilation diffuser bag 12, a heating element 14, and a lumbar support system 16. The ventilation diffuser bag 12 has two main side surfaces, namely an air permeable A-side 18 having perforations 32 randomly disposed over the totality of the air permeable side 18 and an opposite air impermeable, non-perforated B-side 20. The heating element 14 also has two main surfaces, namely an A-side 22 and a B-side 24. Likewise, the lumbar support system 16 has two main surfaces, namely an A-side 26 and a B-side 28.

The A-side 18 and B-side 20 of the diffuser bag 12 are lined with pressure sensitive adhesive, Velcro, (hook and loop fastener), or another similar, suitable material. The B-side 24 of the heating element 14 and the A-side 26 and B-side 28 of the lumbar support system 16 are also lined with pressure sensitive adhesive, Velcro, or another similar, suitable material. The heating element 14 is thereby attachable on the air permeable side (A-side) 18 of the diffuser bag 12 and the lumbar support system 16 is thereby mountable on another side (B-side) 20 of the diffuser bag 12. In this way, the B-side 4 of the heating element 14 faces the A-side 18 of the diffuser bag 12 and the B-side 20 of the diffuser bag 12 faces the A-side 26 of the lumbar support system 16.

The ventilation diffuser bag 12 may include an air permeable fabric 30 encapsulated within the bag. The diffuser bag 12 may also include an air inlet 34 on an end of the bag. The diffuser bag may also be constructed of a polyurethane material such as a polyether polyurethane or similar material. An air mover 36 may be connected to the diffuser bag air inlet 34.

The A-side 22 and B-side 24 surfaces of the heating element 14 may be permeable to allow for air to pass through the heating element 14. The heating element 14 itself may be composed of an air permeable material. The heating element 14 may also include a wire harness 38 for connecting the heating element 14 to an electrical source. Further, the heating element 14 may be a two-dimensional heating element having a textile base material, such as, for example, a nonwoven or a textile filament material which acts as a carrier for electrically conductive contacts and heating conductors that touch one another and form an electric connection. Sending of an electric current through the conductive contacts thereby sends a current through the heating conductors, producing heat and warming the heating element. The heating element 14 is sufficiently flexible to fit the contours of the modular comfort assembly 10. The modular comfort assembly 10 may also include a second heating element 15 (see FIG. 1) that is electrically connected to the first heating element 14.

The lumbar support system 16 may include internal baffles 40 and an air inlet 42. An air pump 50 (see FIG. 1) may be connected to the air inlet 42 to allow for inflation and deflation of the lumbar support system 16.

FIGS. 4 and 5 illustrate an alternative embodiment of a modular comfort assembly 10. In this arrangement, the modular comfort assembly 10 includes a ventilation diffuser bag 12 and a heating element 14. The ventilation diffuser bag 12 has two main surfaces, namely an A-side 18 and a B-side 20. The heating element 14 also has two main surfaces, namely an A-side 22 and a B-side 24. The A-side 18 and B-side 20 of the diffuser bag 12 are lined with pressure sensitive adhesive, Velcro, or another similar, suitable material. The B-side 24 of the heating element 14 is also lined with pressure sensitive adhesive, Velcro, or another similar, suitable material. The heating element 14 is thereby attachable on one side (A-side) 18 of the diffuser bag 12. In this way, the B-side 24 of the heating element 14 faces the A-side 18 of the diffuser bag 12. The ventilation diffuser bag 12 and the heating element 14 may also include all of the features detailed above.

Figure 6:
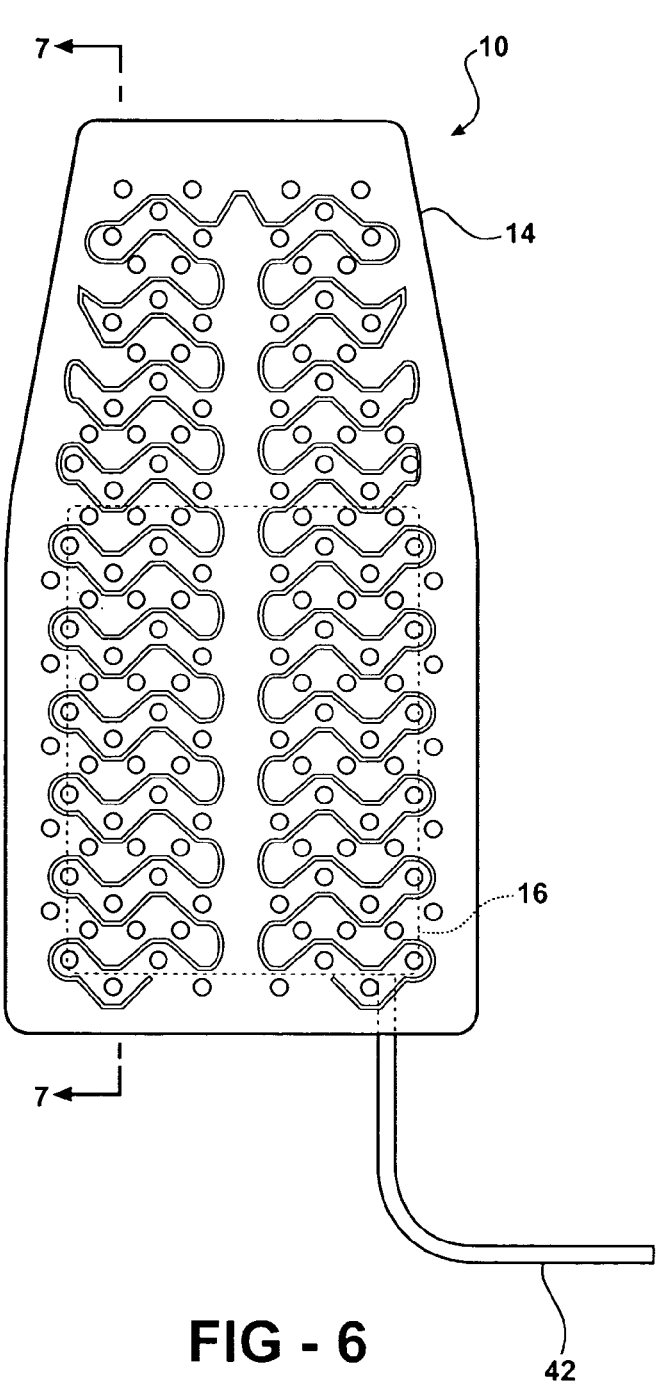
FIG. 6 is a cutaway elevational view of a third embodiment of a modular comfort system including a heating element and a lumbar support in accordance with the invention.
Figure 7:
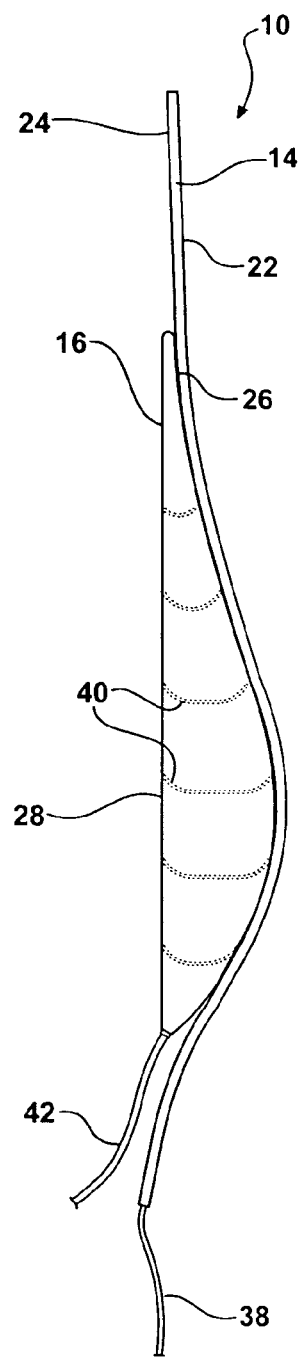
FIG. 7 is a sectional view taken along lines 7—7 in FIG. 6.

FIGS. 6 and 7 illustrate yet another alternative embodiment of a modular comfort assembly 10. In this arrangement, the modular comfort assembly 10 includes a heating element 14 and a lumbar support system 16. The heating element 14 has two main surfaces, namely an A-side 22 and a B-side 24. The lumbar support system 16 also has two main surfaces, namely an A-side 26 and a B-side 28. The B-side 24 of the heating element 14 and the A-side 26 and B-side 28 of the lumbar support system 16 are also lined with pressure sensitive adhesive, Velcro, or another similar, suitable material. The heating element 14 is thereby attachable on one side (A-side) 26 of the lumbar support system 16. In this way, the B-side 24 of the heating element 14 faces the A-side 26 of the lumbar support system 16. The heating element 14 and the lumbar support system 16 may also include all of the features detailed above.

With reference now to FIGS. 1 through 7, installation of a modular comfort assembly 10 in an occupant support is a simple and efficient process. The outer cover (not shown) of the occupant support, in this case an automotive vehicle seat, is opened to unveil the internal foam bun 44 and the support frame 46. The foam bun 44 may also be any other material used for cushioning an automotive vehicle seat. The modular comfort assembly 10 is then mounted to a surface 48 of the foam bun 44 by the pressure sensitive adhesive, Velcro, or other similar, suitable material lining the B-side 28 of the lumbar support system 16 and/or the B-side 20 of the ventilation diffuser bag 12 and/or the B-side 24 of the heating element 14. In the case that the modular comfort assembly 10 includes a second heating element 15 and a second diffuser bag 13, these parts are also mounted to a surface 48 of the foam bun 44 by pressure sensitive adhesive, Velcro, or other similar, suitable material lining the second diffuser bag 13 and/or the second heating element 15.

At this time, diffuser bag air movers 36, which may be either a fan or blower, may be mounted to a backside of the foam bun 44 and the underside of the foam bun 44 by pressure sensitive adhesive, Velcro, or another similar, suitable material. Alternatively, the air movers 36 may also be mounted to the frame in any suitable location near the modular comfort assembly 10, such as on a bottom area or a back area of the frame 46. If the second diffuser bag 13 is not installed, then it is not necessary to mount an air mover to the bottom of the foam bun or bottom of the frame. An air pump 50 connected to the air inlet 42 of the lumbar support system 16 may be mounted onto the frame 46, preferably around the back area of the frame.

Harnesses from the control module 52 are then connected to the lumbar support system 16, the diffuser bags 12, 13 and the heating elements 14, 15. The modular comfort assembly 10 is then enclosed into the occupant support by closing the outer cover (not shown) of the occupant support. This is accomplished by pulling the outer cover back over foam bun 44 and the support frame 48 and re-stitching the outer cover shut.

The modular comfort assembly 10 may be operated and controlled by a single control module 52. Alternatively, the modular comfort assembly 10 may include separate controllers for each component (i.e., the diffuser bag 12, the heating element 14, and the lumbar support system 16) of the assembly.

Although the invention has been described by reference to specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A modular comfort assembly adapted for installation within an occupant support, the comfort assembly comprising:
    a ventilation diffuser bag allowing for circulation of air through said bag;
    said diffuser bag including an air permeable side surface having perforations randomly disposed over the totality of said air permeable side and an opposite air impermeable, non-perforated side, said diffuser bag non-perforated side being supported on an occupant facing surface of the occupant support; and
    a heating element adapted for placement on said air permeable side surface of said diffuser bag.

2. The modular comfort assembly of any one of claim 1, wherein said heating element further comprises a permeable surface to allow for communication of ventilation air through the heating element and heating of said heating element is independent of air movement.

3. The modular comfort assembly of any one of claim 2, wherein the air circulated through said diffuser bag is not conditioned.

4. The modular comfort assembly of any one of claim 1, wherein said diffuser bag comprises an air permeable fabric encapsulated within said diffuser bag.

5. The modular comfort assembly of claim 1, wherein said diffuser bag comprises an air inlet.

6. The modular comfort assembly of claim 5, further comprising an air mover connected to said diffuser bag air inlet.

7. The modular comfort assembly of any one of claim 1, further comprising one of a pressure sensitive adhesive and a hook and loop fastener for mounting the assembly to a surface of a foam bun of the occupant support.

8. The modular comfort assembly of any one of claim 1, wherein the assembly comprises a single control module for operation of the assembly.

9. The modular comfort assembly of any one of claim 1, wherein the assembly comprises a separate controller for each component of the assembly.

10. The modular comfort assembly of claim 1, further comprising a second heating element electrically connected to said heating element and spacedly disposed from said heating element.

11. The modular comfort assembly of claim 1, further comprising a second ventilation diffuser bag including an air permeable surface having perforations randomly disposed over the totality of said air permeable side and an opposite air impermeable, non-perforated side, said second diffuser bag being spacedly disposed from said diffuser bag.

12. The modular comfort assembly of claim 1, further comprising a lumbar support system adapted for placement on said air impermeable, non-perforated side of said diffuser bag.

13. The modular comfort assembly of claim 1, wherein said lumbar support system includes internal baffles.

14. The modular comfort assembly of claim 1, further including an air pump connected to an air inlet of said lumbar support system to allow for inflation and deflation of said lumbar support system.

* * * * *